Patented Oct. 3, 1922.

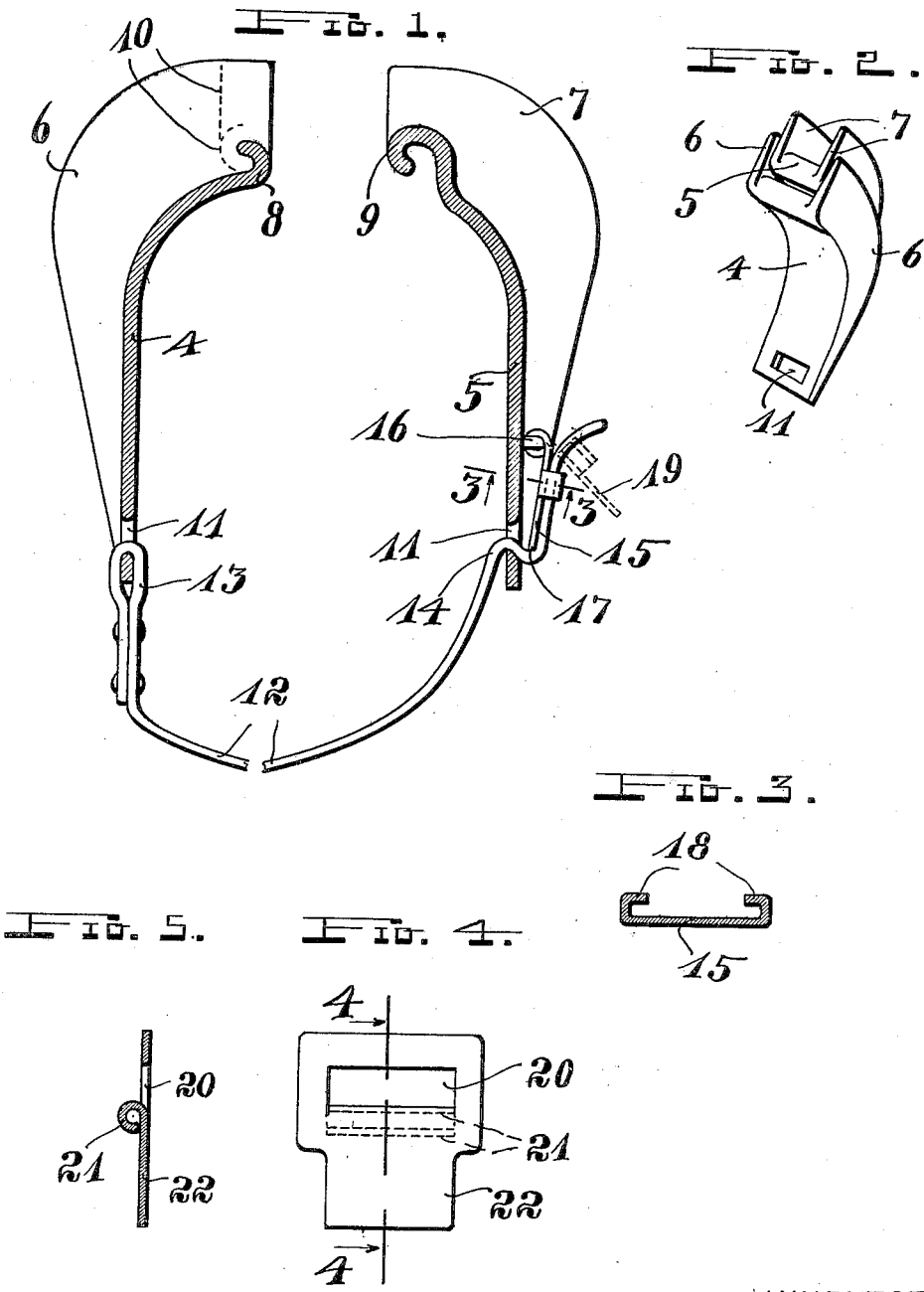

1,430,751

UNITED STATES PATENT OFFICE.

JAMES T. PETERS, OF LOS ANGELES, CALIFORNIA.

TRACTION SHOE.

Application filed June 27, 1922. Serial No. 571,160.

*To all whom it may concern:*

Be it known that I, JAMES T. PETERS, a citizen of the United States, residing at Los Angeles, in the county of Los Angeles and State of California, have invented a new and useful Traction Shoe, of which the following is a specification.

This invention relates to devices applied to the wheels of a vehicle to improve the traction facilities.

One of the objects of this invention is to provide a device that easily and quickly attaches to a wheel without any screws or bolts.

Another object is to provide a device that will securely attach to a wheel without bolts or screws.

Another object is to provide a device hingedly connected in halves, one of the halves being smaller than the other so that it can be placed within the contour of the other in storing position.

Another object is to provide the halves with hook-like engaging members to form hinge connections between the halves in operating position.

Another object is to provide a catch for the strap that does not necessitate any perforations in the strap.

Other objects will appear from the following description and appended claims as well as from the accompanying drawing, in which—

Fig. 1 is a longitudinal midsectional view of the two traction members in disengaged position.

Fig. 2 is a perspective view of the two members one folded or placed into the other.

Fig. 3 is a cross section through the catch member on line 3—3 of Fig. 1.

Fig. 4 is a front elevation of a catch member in a slightly modified form.

Fig. 5 is a section on line 5—5 of Fig. 4.

The traction members 4 and 5 are provided with flanges 6 and 7. The traction member 4, including the flanges 6, is so much wider than the traction member 5 with the flanges 7 that the flanges 6 easily engage over the outside and over the flanges 7 of the traction member 5, as is clearly illustrated in Fig. 2.

The traction member 4 is provided with a hook-like engaging edge 8 between the flanges 6 near one end of the member. The traction member 5 is provided with a co-operating hook-like engaging edge 9 between the flanges 7. Since the traction member 5 is narrower than the traction member 4, the engaging edge 9 engages easily over the engaging edge 8, and the two traction members can be moved and swung around this pivot-like or hinge-like engaging or connecting point to facilitate an engagement over various and different-sized automobile tires. For extremely different tires, of course, different-sized traction members may be used. The engaging of the engaging edge 9 over the engaging edge 8 is illustrated in dotted lines at 10.

The opposite ends of the traction members 4 and 5 are provided with apertures 11. A strap 12 is preferably securely attached to one of the traction members as indicated at 13, while being adjustably passed through the aperture of the other traction member, as indicated at 14. A catch or locking member 15 is pivotally and swingably attached at 16 to the traction member 5. The front end 17 of this member 15 extends and projects well over the aperture 11 in the traction member 5, so that the strap 12 can be pinched between the end 17 of the catching member and outermost edge of the aperture. In fact, when the strap is tightly drawn around a wheel felly or tire, any tendency of the strap to withdraw from the aperture of the traction member 5 serves at the same time to tighten or intensify the gripping or pinching of the catching member. To safeguard against any accidental disengaging of the grip or hold between the catching member 15 and the traction member 5, the catching member is provided with lugs 18, so that the end of the strap can be passed through the space between the lugs and the body of the catching member, as illustrated in Fig. 1.

Should the strap not be passed through the lugs, the end of the strap might flap rearwardly and eventually allow the catching member to disengage, though this is not very likely as long as the strap is tightly drawn through the aperture and past the end of the catching member so as to utilize the tendency of the strap to withdraw from the aperture for drawing the end of the catching member further into the aperture and thereby increase the gripping effect between the catching member and the edge of the aperture in the traction member 5. However, as long as the strap is passed through the lugs in the manner described, any possibility of disengagement between the strap and the catching member, and thereby from the traction member 5, is eliminated.

The traction members can easily be placed together as illustrated in Fig. 2, to require little room or space in an automobile, and the strap can easily be wound around the traction members partly between the innermost flanges 7 of the traction member 5, so as to increase the required space to a very little extent.

Wheels of automobiles are apt to mire into the dirt instead of propelling or moving the automobile out or ahead, when the wheels are caused to rotate without being allowed a proper grip or support. To avoid such troubles, the above described device is applied to a driving wheel to form sufficient gripping facilities, to warrant a safe propelling of an automobile over soft and muddy surfaces.

The slightly modified form of catching member illustrated in Figs. 4 and 5 is to some extent simpler than the catching member illustrated in Figs. 1 and 3, since the strap can be passed through the aperture 20, produced by the punching of the hinge-portion 21 out of the catching member 22. The forming of the hinge for the catching member in this form thereby produces at the same time the holding means for the strap, instead of requiring extra lugs.

Having thus described my invention, I claim:

1. In a traction shoe, a pair of traction members having oppositely arranged hook-like engaging edges to adjustably and swingably connect the members.

2. In a traction shoe, a pair of traction members having oppositely arranged hook-like engaging edges to adjustably connect the members for a swinging movement towards and away from each other.

3. In a traction shoe, a pair of traction members, one of the members having a hook-like engaging edge projecting outwardly at one of its terminations, the other member having a hook-like engaging edge projecting inwardly at one of its terminations for swingably engaging with the first-named engaging edge.

4. In a traction shoe, a pair of traction members, one of the members having a hook-like engaging edge projecting outwardly at one of its terminations and having an aperture near the opposite termination, the other member having a hook-like engaging edge projecting inwardly at one of its terminations for swingably engaging with the first-named engaging edge and having also an aperture at the opposite termination, and a strap secured to the apertured end of one traction member and adjustably passed through the aperture of the other traction member.

5. In a traction shoe, a pair of traction members, both traction members being swingably engaged at one end and having apertures at the opposite ends, a strap attached to the apertured end of one traction member and adjustably passed through the aperture in the other traction member, and a catching member swingably attached to the last-named traction member projecting towards the last-named aperture so as to produce a pinching and gripping effect on the strap in the aperture.

6. In a traction shoe, a pair of traction members swingably attached at one of their ends and having each an aperture in the opposite end, a strap attached to the apertured end of one traction member and adjustably passed through the aperture in the other traction member, and a catching member swingably attached at the adjusting end of the device and extending over the aperture through which the strap is adjustably passed, the catching member having also means by which the free end of the strap can be held to the catching member.

In testimony that I claim the foregoing as my invention I have signed my name in the presence of two subscribing witnesses.

JAMES T. PETERS.

Witnesses:
O. H. KRUEGER,
JESSIE A. MONOCK.